Figure 1:
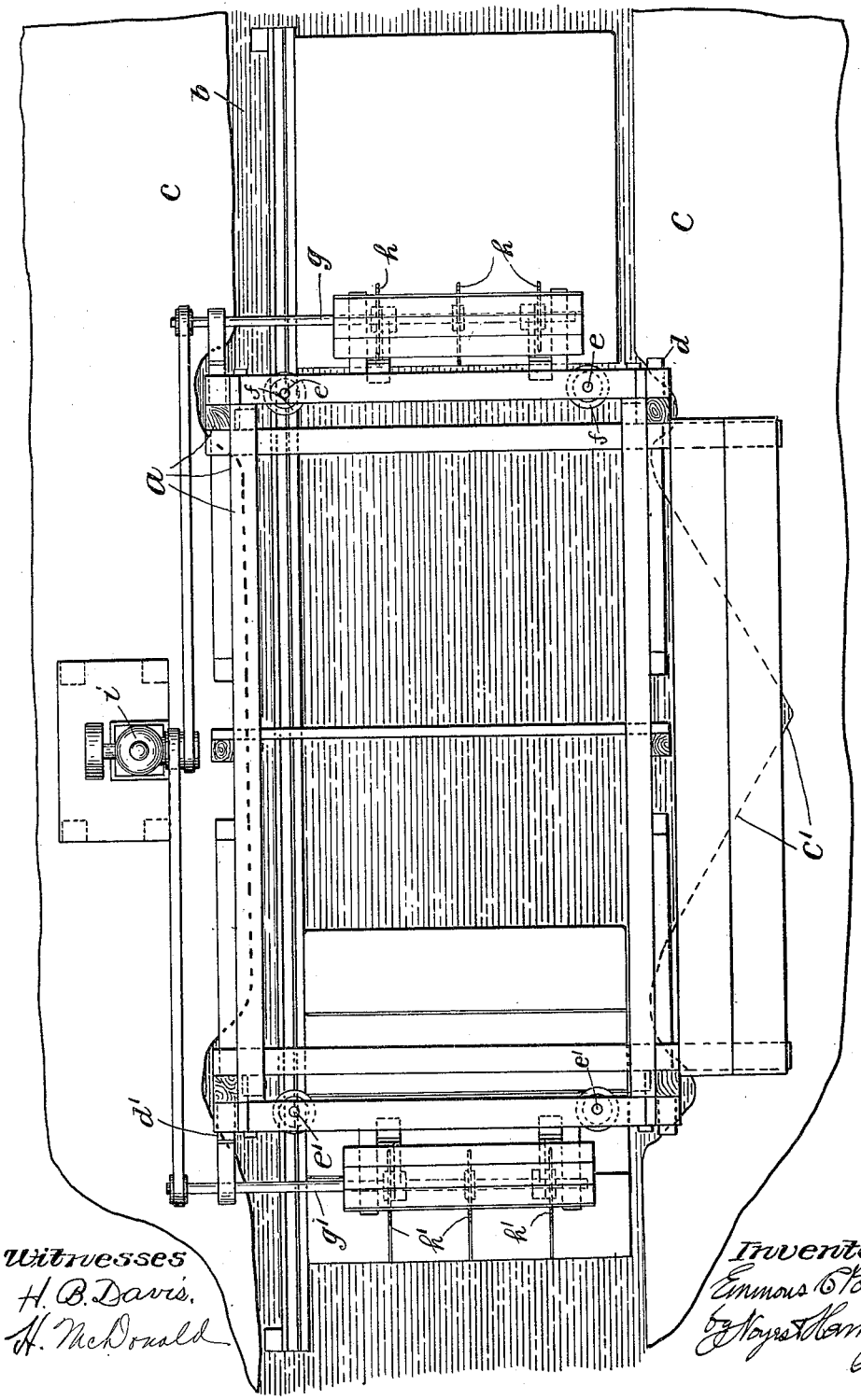

E. C. PORTER.
ICE HARVESTING APPARATUS.
APPLICATION FILED MAR. 1, 1912.

1,138,312.

Patented May 4, 1915.
2 SHEETS—SHEET 1.

Witnesses
H. B. Davis.
H. McDonald.

Inventor:
Emmons C. Porter
by Noyes & Harriman
Attys

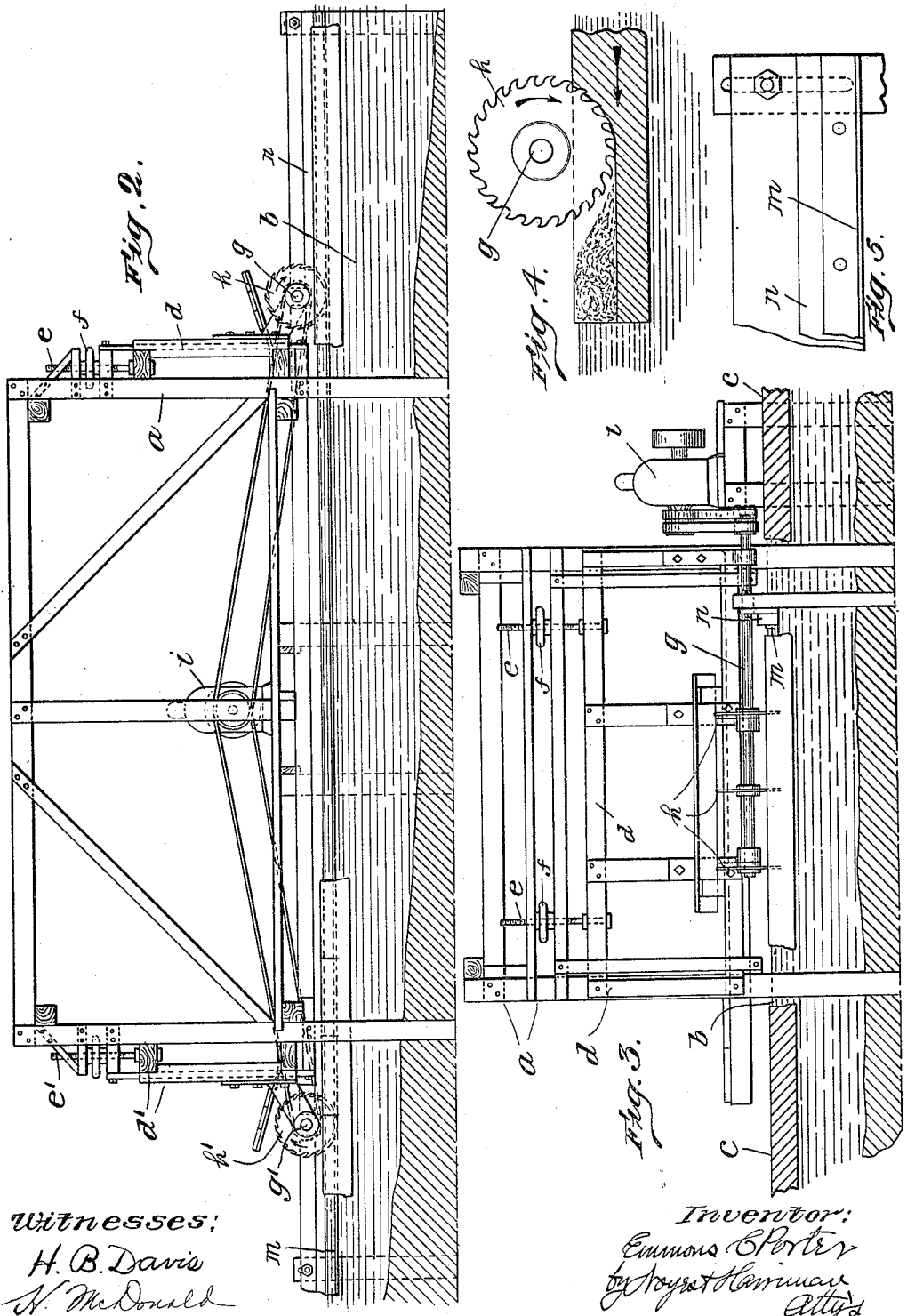

UNITED STATES PATENT OFFICE.

EMMONS C. PORTER, OF BROCKTON, MASSACHUSETTS.

ICE-HARVESTING APPARATUS.

1,138,312. Specification of Letters Patent. Patented May 4, 1915.

Application filed March 1, 1912. Serial No. 680,827.

*To all whom it may concern:*

Be it known that I, EMMONS C. PORTER, a citizen of the United States, residing at Brockton, in the county of Plymouth and State of Massachusetts, have invented an Improvement in Ice-Harvesting Apparatus, of which the following is a specification.

In harvesting ice, it has been customary to groove the ice fields with ice plows, or similar appliances, then to cut the fields into large sections, or "floats," which are floated through a channel to the ice-house, and are split, by a hand chisel, into small cakes, just before they are delivered to the conveying chain.

The method of grooving now generally employed is slow and somewhat expensive, and it frequently happens, from various causes, that the grooves become filled with water, which freezes, so that it is impossible to split the sections into regular cakes. This is particularly liable to occur when the sections are floated a considerable distance in very cold weather, as the water is likely to flow into the grooves and then freeze before the section is split.

Various forms of apparatus have been devised for grooving ice fields which comprise a vehicle having circular saws mounted thereon, but if practical devices of this sort were produced, they would not overcome the difficulty above noted where it is necessary to float the sections long distances.

The object of my invention is to produce a practical means for grooving the ice sections by power-mechanism just before they are to be split into cakes, so that grooving in the fields, is, to a large extent, made unnecessary, and the danger that the sides of the grooves, after they have been formed, may become frozen together, is wholly avoided. I accomplish this object by providing a structure over the channel through which the ice-sections are conducted to the ice-house, which comprises a gang of circular saws driven by any suitable motor, so arranged that, as the sections are floated along in the channel, they will be grooved so that they may be readily split into cakes.

For an understanding of my invention reference is made to the accompanying drawing, in which, Figure 1 is a plan view of an apparatus made according to my invention. Fig. 2 is a side elevation thereof. Fig. 3 is an end view, and Fig. 4 is a detail view showing the action of one of the circular saws. Fig. 5 is a detail view of the edge-gage and its adjusting means.

In the drawing *a* indicates a structure which is suitably supported at opposite sides of a channel *b*, formed in the ice *c*, said channel leading from the ice field to the ice-house in the usual manner, the structure being so formed that the ice-sections may be floated there-beneath, as they are drawn along in the channel. A frame *d* is mounted on the front end of the structure *a*, and is supported thereon by a pair of vertically arranged screws *e*, by means of which it may be adjusted vertically, suitable hand-wheels *f* being threaded on said screws, which are supported directly on the structure. A shaft *g* is mounted horizontally in the frame *d*, and extends at right angles to the channel, and a gang of parallel circular saws *h*, equally spaced apart and preferably three in number, are arranged on said shaft *g*, a motor *i* being provided to drive the same.

A frame *d'*, similar to frame *d*, is mounted on the rear end of the structure, said frame also being vertically adjustable by means of screws *e'*, and having a horizontal shaft *g'* mounted thereon and driven from said motor, said shaft being provided with a gang of circular saws *h'* arranged in exact alinement with the circular saws *h* at the front end of the structure. Both frames are adjusted so that the saws dip into the water to a suitable depth, as hereafter described.

An edge-guide is mounted on a structure, at one side of the channel, and extends from a point at some distance in front of the saw gang *h* to a point some distance beyond the rear gang *h'*, said guide preferably comprising an angle-iron *m* which is mounted on a support *n*, said support being vertically adjustable on the structure by suitable means, such as the slot and bolt connection shown in Fig. 5. One edge of the angle-iron *m* is arranged parallel to the planes of the circular saws *h* and *h'*, and at the same distance from the next adjacent saws, as the distance which the saws are spaced apart. Said angle-iron *m* is so adjusted that it is held a short distance below the water level, in such a position that, when a cake of ice is floated against it, the edge of the iron will engage the smooth, previously grooved portion of the edge thereof above the points where it is split, the smooth portion usually extending to a depth of six or eight inches. That is, if a saw having a hook-shaped tooth, as shown in Figs. 2 and 4, is employed, which form is the only one which it is practical to employ, so far as I am aware, the saws will be so arranged on the shaft that the teeth in their lower portions will "hook", or point in the direction in which the ice is to be moved in passing through the channel from the ice field to the ice house, and so that, when the saws are rotated forward, or in the direction in which the teeth point, to saw or groove the ice as it passes beneath the shaft, they will be moving downward, and rearward in said direction of movement, while they are cutting. The circular saws $h$, $h'$ are so arranged that they must be driven in such a direction that their lower portions move in the direction in which the ice is floated as it passes through the channel, as illustrated in Fig. 4.

In practice a section, or float, is cut from the field, which has previously been grooved to an extent sufficient to enable said section to be separated from the field, and the section thus separated is floated along the channel to the structure, preferably with hand poles, in the usual manner. Before the section is floated into engagement with the circular saws, one edge of the section is pressed against the edge-guide $m$, and is held thereagainst while it is floated into engagement with the saws. The saws $h$ are adjusted to dip into the water a distance corresponding to the depth to which the ice is to be grooved, so that when the section is floated therebeneath, the saws will cut grooves to a corresponding depth, in the upper sides thereof. That is, as ice, when floating, is about seven-eighths submerged, the depth of the groove which is cut will actually be slightly greater than the extent to which the lower portion of the saws dip in the water, the extent of this variation depending on the thickness of the ice, which may be offset by the slight extent which the ice may be additionally submerged from the downward cutting action of the saws. As the saws are regularly spaced from the edge-guide $m$, the grooves which will be cut will not only be parallel, but will be equally spaced with relation to the edges of the ice float or section, as well as with relation to each other. With the construction shown in the drawing, three parallel grooves will be cut in the ice section, so as to prepare it for separation into four longitudinal sections.

By so arranging the saws that they are and must be rotated so that their lower portions move in the direction in which the ice sections are to be floated, various important advantages are secured. When the saws are rotated freely in the water, while they are not in engagement with an ice section, they will act like paddle wheels, and throw and draw the water in the direction in which their lower portions are moving. This will create a current in the water in the direction in which the sections are being floated, so that, as soon as a section is floated in proximity to the saws, the propulsion thereof will be assisted by the current thus created, which, obviously, is most effective just before the section comes into actual engagement with the saws. As soon as the saws engage the ice section, they will exert a pulling action thereon, caused by the horizontal component of the cutting force, as they remove the chips, thereby having a combined feeding and cutting action, so that they act to draw the sections along as fast as they cut the grooves therein. The entire feeding of the ice thus takes place automatically, without the employment of independent feeding mechanism.

Other advantages of importance are also secured by rotating the saws in the particular direction specified, especially as distinguished from results which might be secured if the saws were rotated in the opposite direction;—with which arrangement, the saws would create a current which would tend to retard the movement of the ice sections, and would necessitate the positive forcing of the sections against the action of the saws. Among the more important of these advantages is that arising from the fact that the ice chips are piled up in the rear of the saws in the grooves, as shown in Fig. 4, preventing the water from flowing into the grooves, against the saws, so that they would act to throw up water while cutting, and also preventing the water from interfering with the cutting action by being drawn into the space between the bottom of the groove and the edge of the saw, as would be the case, if the saws were rotated oppositely, and thereby causing the water to become trapped therebetween, so that it would materially obstruct the saw teeth from entering the ice.

It is also of advantage to perform the grooving operation on the ice blocks while floating, as distingushed from doing this while supported on a platform, runway, or other rigid means, for the reason that, in addition to providing a yielding means, or support for holding the ice in engagement with the saws, the danger of breaking off portions of the block is avoided. That is, while the danger of breakage in handling newly formed ice is small, on account of its toughness it is frequently necessary to harvest ice which has become "honeycombed," and therefore breaks, or chips off very easily, but, so long as it is operated on while supported by water, the danger of breakage is small, although, if it were lifted onto a rigid support before it was operated on, the danger of breakage would be great. To lift it onto a support to be grooved and then to return it to the water to be split with the ordinary ice chisel, which would be practically essential to avoid breakage, would obviously be more wasteful of power than the other method. As the ice is floating freely as it is being grooved, the water provides a yielding support therefor, so that the saws will not cut chips that are any heavier than what they can remove to the best advantage, and the ice yields when there is a tendency to cut too heavy a chip. That is the support which is provided for the ice is universally yielding and, therefore, automatically holds the ice against the saw with the force which enables the saw to operate to the best advantage.

After the floating section of ice has passed beneath the first set of saws, and the longitudinal grooves have been cut therein, it is turned quarter way around in the channel, a V-shaped recess $c'$ being provided in one side of the channel between the gangs of saws, and, what was previously the rear end of the section is pressed against the edge-guide $m$, and the section is then floated beneath the second gang of saws while held thereagainst, and grooves are cut across the section in a manner similar to that already described, so that it is thus grooved in equal squares, and may be readily split into square cakes with the ordinary ice chisel.

In order that the ice may be handled with facility, the section is split into cakes close to the point where the cakes are delivered to the conveying chain, and, as the grooving apparatus should be located closely adjacent this point, there is no opportunity for the grooves to become filled with ice between the time they are formed and the time when they are split.

When the above apparatus is employed grooving of the ice field is unnecessary, except to an extent sufficient to cut out the ice sections, or "floats" therefrom, and the final grooving is performed without loss of time in the handling of the ice.

While the saws might be so adjusted as to cut the ice completely through, to do this would be objectionable, for if a portion of the edges of the ice cakes was not uneven the cakes would pack together so closely in the ice-house that they would freeze together, making removal in cakes almost impossible.

It will be observed that by grooving the ice by circular saws while it is floating and by rotating the saws in the direction in which the ice is moved, I have devised a new principle of operation, for the ice is fed by the saws themselves only so fast as they can groove it, any tendency to take too large a chip being overcome by the yielding or increased submergence of the ice, while it is free to be drawn into engagement with the saws as fast as they can cut it.

I claim:—

1. In an apparatus for grooving ice, the combination with a body of water in which the ice is floated and which provides a yielding support therefor, a circular saw supported with its lower portion beneath the surface of the body of water, and means to rotate the saw, as the ice is floated therebeneath, to groove its upper surface.

2. In an apparatus for grooving ice, the combination with a body of water in which the ice is floated and which provides a yielding support therefor, a gang of suitably spaced circular saws supported with their lower portions dipping beneath the surface of the body of water, and an edge guard correspondingly spaced from said saws and arranged adjacent said surface to guide the ice as it is floated beneath the saws.

3. In an apparatus for grooving ice, the combination with a body of water in which the ice is floated and which provides a yielding support therefor, a circular saw supported with its lower portion below the level of said body of water, means to guide the ice as it is floated beneath the saw in a predetermined direction and means to drive the saw so that its lower edge moves in the same direction.

4. In an apparatus for grooving ice, a yielding support for the ice, comprising a body of water in which the ice is floated in a predetermined direction, a circular saw arranged to permit the ice to be floated therebeneath, and means to rotate said saw so that its lower edge moves in the direction in which the ice is floated.

5. In an apparatus for grooving ice, the combination with a structure supported at the side of a channel in which ice-sections are floated, of a pair of gangs of circular saws mounted to rotate about parallel axes, the saws of each gang being equally spaced apart and each saw of one gang being arranged to rotate in the plane of rotation of a saw of the other gang, and the space between said gangs being sufficient to permit the ice-sections to be turned through a right angle therebetween, and an edge-guide for the floating sections mounted at one side of the channel in parallelism with the planes of rotation of the saws and at a distance from the adjacent end saw equal to the space between the saws, substantially as described.

6. In an apparatus for grooving ice, the combination with a structure supported at the side of a channel in which ice-sections are floated, of a pair of gangs of circular saws mounted to rotate about parallel axes, the saws of each gang being equally spaced apart and each saw of one gang being arranged to rotate in the plane of rotation of a saw of the other gang, and the space between said gangs being sufficient to permit the ice-sections to be turned through a right angle therebetween, and means to guide said sections as they pass beneath each saw gang, substantially as described.

7. In an apparatus for grooving ice, the combination with a body of water in which the ice is floated and which provides a yielding support therefor, a structure mounted adjacent said body of water, a horizontal shaft mounted on said structure, a pair of circular saws mounted on said shaft, means for driving said shaft, means permitting vertical adustment of said shaft to hold said saws so that their lower portions may dip into the water to varying depths, and an edge-guide supported in parallelism with said saws below the water level and at a distance from one saw equal to the space therebetween.

8. In an apparatus for grooving ice, a supporting frame adapted to be fixedly supported adjacent a body of water, a rotary cutter supported from said frame, said cutter being positioned so that the lower portion thereof will be positioned beneath the water adjacent the supporting frame, and means to rotate said cutter whereby as a body of ice is floated therebeneath on the water its upper surface will be grooved.

9. In an apparatus for harvesting ice, a rotary cutter mounted above the surface of a body of water with its lower portion dipping therein, in position to engage a block of ice, supported in the water, to cut a groove in the upper surface of the block as it is passed therebeneath.

10. In an apparatus for harvesting ice, a cutting device arranged to engage a block of ice, while supported in a body of water, and operating vertically and horizontally to cut a groove in said block, and to impart movement thereto, in the direction in which the groove is cut, through the action of the horizontal components of its cutting force.

11. In an apparatus for harvesting ice, a stationarily supported cutting device having teeth arranged operatively to engage a block of ice, while supported in a body of water, and means to operate said device to move the block of ice and said teeth while operating thereon in the same horizontal direction.

12. In an apparatus for harvesting ice, a toothed cutting device stationarily mounted above a body of water, in which a block of ice is supported, and means to operate said cutting device to move its teeth in a downward and rearward direction, to cut the ice and simultaneously propel it in said rearward direction.

13. In an apparatus for harvesting ice, an actuating and grooving device arranged to operate on a block of ice, while floating in a body of water, to effect horizontal movement of the block and to cut a groove in its upper side longitudinally of the direction of its movement.

14. In an apparatus for harvesting ice, a rotary cutter arranged to engage a block of floating ice, and means to rotate said cutter to impart movement to the ice in a predetermined direction and to cut a groove therein in line with the direction of said movement.

15. In an apparatus for harvesting ice, a horizontally disposed shaft stationarily journaled adjacent and above the surface of a body of water, in which a block of ice is floated, a circular saw mounted on said shaft in position to engage the upper side of the block, and means to rotate said shaft in a direction to carry the saw teeth downward into operative engagement with the block, to cut a groove in its upper side, and, as the teeth move rearward, to draw the block through the water in the same direction.

16. In an apparatus for harvesting ice, a toothed cutter mounted to rotate about a horizontal axis disposed adjacent and above the surface of a body of water, means to guide a block of ice through the water in a horizontal direction, beneath said axis, and at right angles thereto, said cutter depending into the path of movement of the block, and means to rotate said cutter to move its teeth downwardly and beneath its axis in the direction of movement of the block, while in engagement therewith, to cut a groove therein and to impart movement thereto in said direction by the force of the cutting action.

17. In an apparatus for grooving blocks of ice, a pair of gangs of circular saws supported over a body of water, so that the lower portions thereof dip into the water, the saws of each gang being axially arranged and correspondingly spaced apart, and the space between each gang being sufficient to permit the block to pass out of engagement with one gang before it is engaged by the other and to be engaged by the second gang in a position at right angles to that in which it was engaged by the first gang, successively to cut two series of parallel grooves in the block at right angles to each other.

In testimony whereof, I have signed my name to this specification, in the presence of two subscribing witnesses.

EMMONS C. PORTER.

Witnesses:
L. H. HARRIMAN,
H. B. DAVIS.